United States Patent [19]

Simon

[11] Patent Number: 5,068,971

[45] Date of Patent: Dec. 3, 1991

[54] ADJUSTABLE PORTABLE COORDINATE MEASURING MACHINE

[75] Inventor: Louis Simon, Grosse Pointe Shores, Mich.

[73] Assignee: Simco Industries, Inc., Roseville, Mich.

[21] Appl. No.: 497,964

[22] Filed: Mar. 23, 1990

[51] Int. Cl.$^5$ .................................. G01B 5/03
[52] U.S. Cl. ........................ 33/503; 33/572
[58] Field of Search ............... 33/1 M, 503, 556, 572

[56] References Cited

U.S. PATENT DOCUMENTS

| | | | |
|---|---|---|---|
| 2,504,961 | 4/1950 | Braaten | 33/572 |
| 3,377,713 | 4/1968 | Schiler | 33/503 |
| 3,501,840 | 3/1970 | Schiler | 33/556 |
| 3,531,868 | 10/1970 | Stevenson | 33/503 |
| 4,133,112 | 1/1979 | Matthiessen | 33/1 M |
| 4,213,244 | 7/1980 | Bell et al. | 33/503 |
| 4,507,872 | 4/1985 | Schermann | 33/556 |
| 4,631,834 | 12/1986 | Hayashi et al. | 33/503 |
| 4,763,420 | 8/1988 | Meabe et al. | 33/1 M |
| 4,798,006 | 1/1989 | Barnaby | 33/503 |
| 4,941,265 | 7/1990 | Heiland | 33/503 |

*Primary Examiner*—Thomas B. Will
*Attorney, Agent, or Firm*—Kinzer, Plyer, Dorn, McEachran & Jambor

[57] ABSTRACT

A portable coordinate measuring machine has an adjustment mechanism that allows fine movement of the base into alignment with reference lines or planes. The machine has a heavy base pivotally mounted at one end on a first support and slidably mounted at the other end on a second support. The second support has a pair of arcuate slots that receive a pair of pins connected to the base member. A lead screw is connected to the base member and threadedly engaged with a nut. The nut is pivotally connected to the second support. A user turns a handle or wheel on the lead screw to cause the base to pivot about the pivot point of the first support. This pivoting motion effects fine adjustment of the base's position to align it with reference lines or planes.

22 Claims, 2 Drawing Sheets

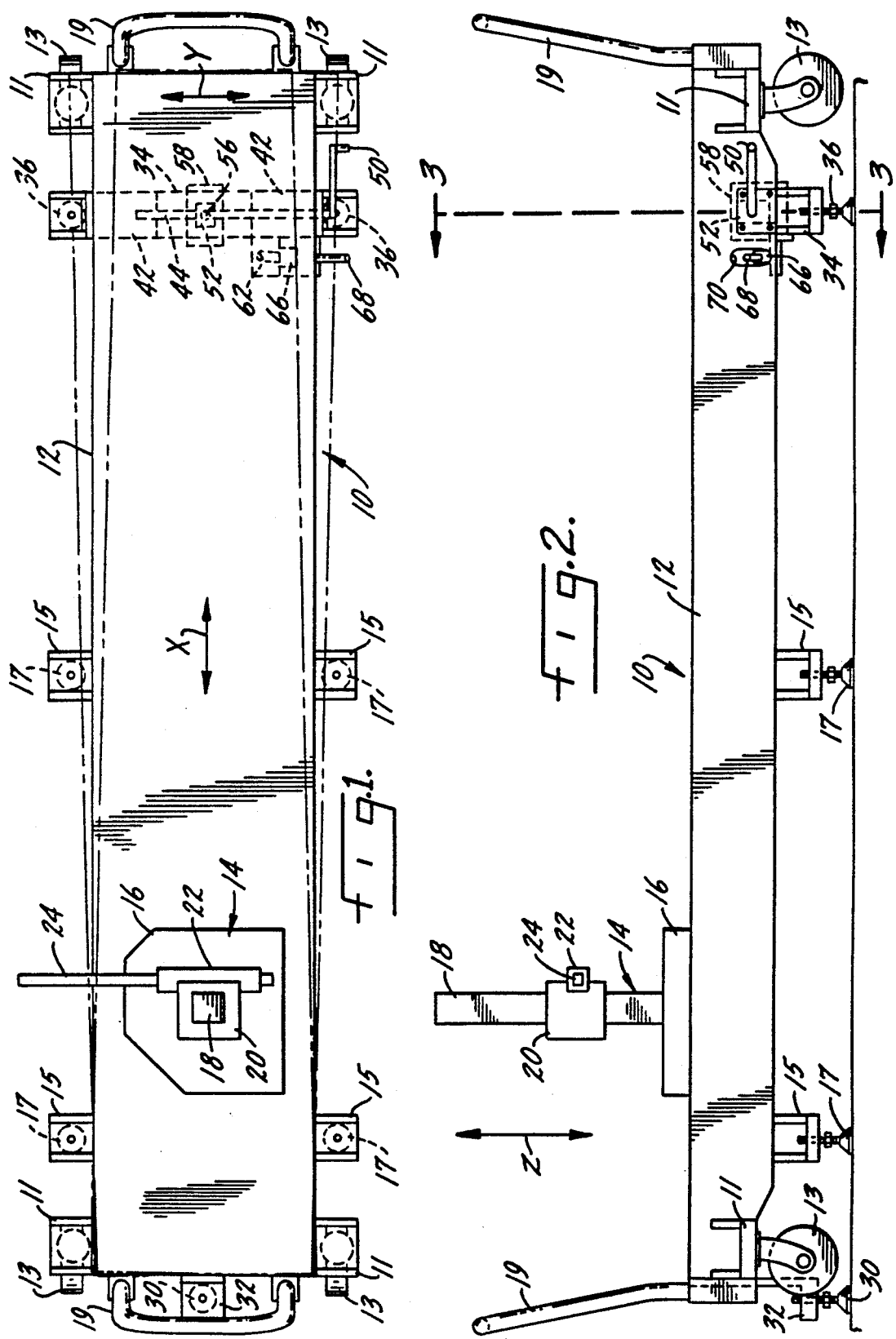

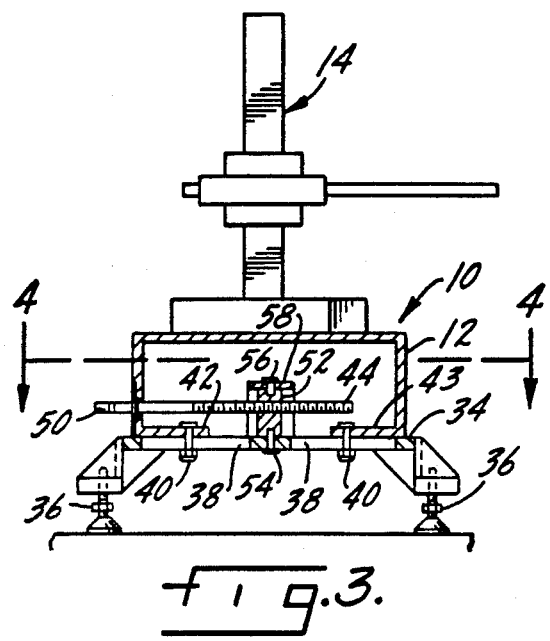
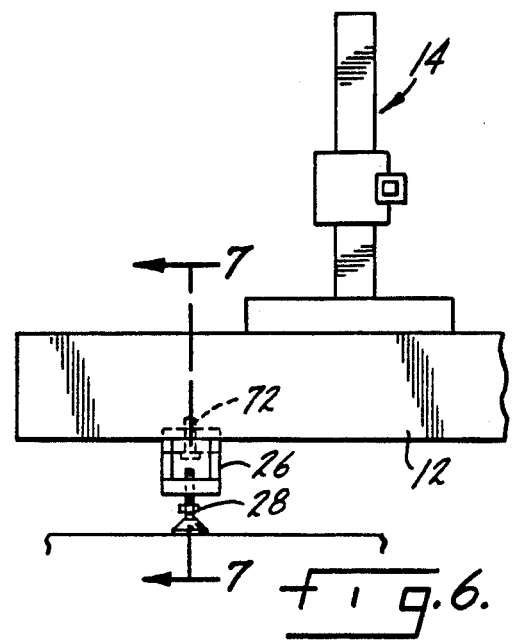
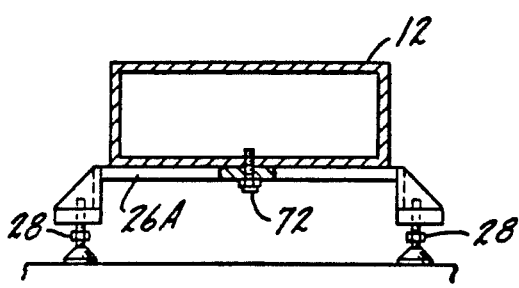
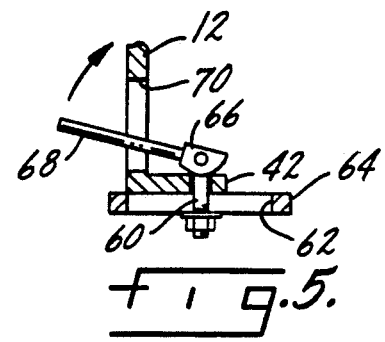
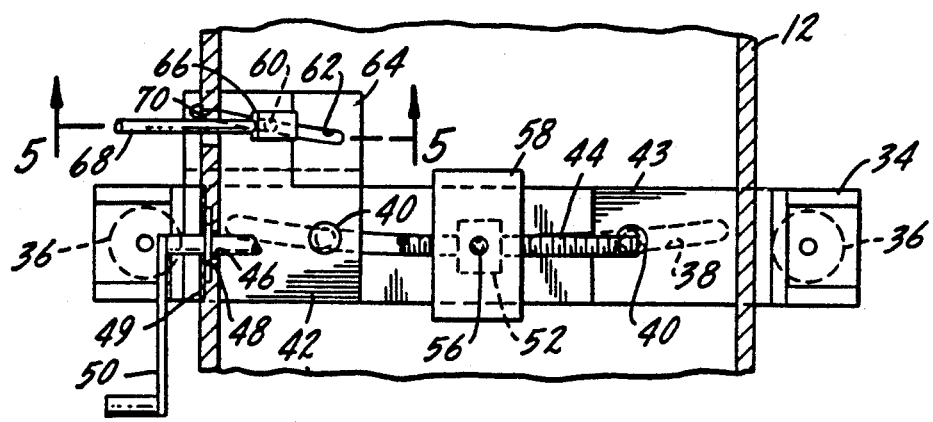

ADJUSTABLE PORTABLE COORDINATE MEASURING MACHINE

BACKGROUND OF THE INVENTION

This invention relates to coordinate measuring machines and is particularly concerned with a portable layout coordinate measuring machine.

Portable coordinate measuring machines are frequently used for, among other things, measuring work pieces which cannot be transported to and placed on a fixed machine. In such cases, a portable coordinate measuring machine is taken to the work piece instead. To make accurate measurements, the portable machine must be set up accurately relative to reference lines or planes associated with the work piece. It is commonly required to establish the position of the base of the coordinate measuring machine within a few ten-thousandths of an inch. In the past this has been a protracted procedure of trial and error because there has been no way to effect lateral (y-axis) fine adjustment of the heavy base.

The base may be easily levelled to the work piece using the leveling feet, but sliding a total machine weight of approximately one ton along the floor in such a manner as to be accurate to within a few ten-thousandths of an inch is extremely difficult. Thus, the machine of the present invention represents a significant improvement in portable coordinate measuring machine design by allowing easy adjustment in the lateral (y-axis direction.

SUMMARY OF THE INVENTION

The present invention is directed to a portable coordinate measuring machine. A primary object of the invention is a portable coordinate measuring machine having an adjustment feature which permits fast, accurate set up of the machine relative to a work piece's reference lines or planes.

The machine has a measuring instrument mounted on a heavy base member. The base member rests on first and second supports. The first support comprises a single leveling foot secured to the base along its longitudinal center line. The second support comprises a beam extending underneath the base member. Leveling feet at the first and second supports and at the center of the base permit precise leveling of the base.

The beam of the second support has a pair of arcuate slots formed therein. A pair of pins are connected to the underside of the base member and extend through the slots in the beam. The base is slidable on top of the lubricated second support beam, to the extent permitted by the pins' freedom in the slots.

A lead screw has a collar which fits in a depression in a side wall of the base. The collar is retained therein by a plate. The lead screw also threadedly engages a nut which is pivotally connected to the second support beam. Rotation of the lead screw causes the base member to slide on the second support in a pivoting motion about the single foot of the first support. After the machine has been set in place and coarsely aligned with a reference line, a user turns the lead screw to effect fine adjustment of the base member's position. A brake is provided to fix the base relative to the second support once it attains the desired position.

BRIEF DESCRIPTION OF THE DRAWINGS

FIG. 1 is a plan view of the coordinate measuring machine of the present invention.

FIG. 2 is a front elevation view of the machine of FIG. 1.

FIG. 3 is a section taken along line 3—3 of FIG. 2.

FIG. 4 is a section, on an enlarged scale, taken substantially along line 4—4 of FIG. 3.

FIG. 5 is a section taken along line 5—5 of FIG. 4, showing the brake.

FIG. 6 is a front elevation view of the pivoting end of the machine, showing an alternate embodiment of a pivotable support.

FIG. 7 is a section taken along line 7—7 of FIG. 6.

DETAILED DESCRIPTION OF THE INVENTION

FIGS. 1 and 2 illustrate the general arrangement of a portable coordinate measuring machine 10 according to the present invention. The machine includes a heavy base member shown diagrammatically at 12. "Heavy" in the context of this invention means having a weight and strength sufficient to provide a stable, unmoving and true foundation for a coordinate measuring device.

The base may be an elongated, rectangular casting weighing about 1600 pounds. A lattice of ribs and webs (not shown) lend rigidity to the otherwise hollow casting. The casting includes four shoulders 11 which support wheels 13. Preferably the wheels are mounted in casters. The casting also has a plurality of legs 15 along its sides. The shoulders 11 and legs 15 are preferably integrally formed in the base, although they could be separate pieces bolted or similarly attached to the base. Each leg 15 mounts a foot 17 which can be raised and lowered by virtue of a threaded engagement with the legs. Handles 19 are attached to the ends of the base.

The base is made heavy to provide a firm foundation for the coordinate measuring device shown generally at 14. The measuring device 14 has a pad 16 mounting a vertical post 18. The post carries a vertically adjustable collar 20 which in turn supports the sleeve 22 of measuring arm 24. The collar 20 provides adjustability of the sleeve and measuring arm in the direction of the Y axis (FIG. 1). The post 18 provides adjustability of the collar 20 along the Z axis (FIG. 2). It will be understood that the upper surface of the base will have bars, grooves or tracks allowing the pad 16 to move longitudinally along the indicated axis X (FIG. 1). A dust cover may also be provided to protect the upper surface of the base.

The base member 12 is supported near its ends by first and second support means. The first support means comprises a pivot foot 30 mounted in a frame 32 located at the end of the base and on its longitudinal center line. The pivot foot is threaded in an opening in the frame 32. The frame is welded or otherwise fastened to the end of the base member 12.

The second support means has a transverse beam 34 which extends underneath the base. Leveling feet 36 are threaded into the ends of beam 34. The base is not fixed to the transverse beam 34. Rather, the base is slidable on the lubricated top surface of beam 34 in the direction of the Y-axis but not the X-axis. Details of the structure making this sliding motion possible are shown in FIGS. 3 and 4. The beam 34 has a pair of arcuate slots 38 formed therein. The center of the arc defined by the slots 38 is the pivot foot 30 of the first support means. Guide pins 40 extend through the slots 38. Nuts on the bottom of the guide pins retain the pins in the slots while allowing them to slide therein. The upper ends of the guide pins are held in plates 42 and 43. The plates are integrally formed in the base member casting. Alternately they could be separate pieces welded or otherwise fixed to the base.

Actuator means are provided for effecting sliding movement of the base member on the second support means. The actuator in the illustrated embodiment comprises a lead screw 44. The lead screw extends through a passage 46 (FIG. 4) in a side wall of the base 12. The passage includes a hole all the way through the side wall and two counterbores which extend partially into the exterior surface of the wall. A collar 48 fixed to the screw 44 fits in the first counterbore. A plate 49 disposed in the second counterbore is bolted to the base 12. The base traps the collar of the lead screw 44, although the collar and plate fit loosely enough to permit the screw to rotate. A handle or wheel 50 is attached to the end of the lead screw. The handle may incorporate a ratchet.

The lead screw 44 threadedly engages a nut 52. The nut is pivotally mounted on stubshafts 54 and 56. Stubshaft 54 extends through the beam 34 while shaft 56 is mounted on a cage 58. The cage is bolted to the beam 34. The lead screw 44 and nut 52 are positioned such that the screw is always tangent to the arc defined by slots 38. This arrangement prevents binding of the screw as the base moves.

FIGS. 4 and 5 illustrate a brake which can be used to releasably fix the base member to the second support means. The brake comprises a cam-actuated bolt 60. The bolt 60 extends through a hole in plate 42 and through an arcuate slot 62 in a bracket 64. The bracket is fixedly attached to the beam 34. The lower end of bolt 60 has a nut and washer retaining the bolt in slot 62. The upper end of the bolt 60 is pinned to a cam 66. A handle 68 attached to cam 66 extends through an elongated opening 70 in the base member side wall.

The use, operation and function of the described embodiment are as follows. With its leveling feet raised, the portable coordinate measuring machine 10 can be moved about on its wheels 13 by pushing on handles 19. The machine 10 is maneuvered into approximate position on its wheels. Then the feet 30 and 36 at the first and second supports are lowered. This is done by turning the feet with a wrench or other suitable tool. The feet are lowered sufficiently to lift the wheels off the floor. The machine is then levelled by adjusting the feet 30 and 36. The leveling feet 17 are not lowered at this time.

The brake is released by lowering the handle 68. If the machine is out of alignment along the Y-axis, the crank 50 is turned to cause translation of the lead screw 44 in the nut 52. Entrapment of the collar 48 between the base and the plate 49 causes the base to move with the lead screw. Consequently, the base slides on the top surface of beam 34, pivoting about the foot 30 at the other end of the base.

The pivoting motion of the base member is indicated in phantom lines in FIG. 1. The arcuate shape of the slots 38 and 62 permits non-binding sliding motion of the base. Also, the pivotable mounting of the nut 52 permits the lead screw to remain essentially tangential to the arc of motion. The pins 40 prevent any unwanted longitudinal motion of the base on the beam 34. The pins also limit the extent of arcuate motion so the base cannot be inadvertently pivoted off the support beam.

For reference purposes only, the slots are sized to accommodate about four inches of motion in either direction from a central position.

Once the base member is precisely aligned in the described manner the brake is applied by raising the lever 68. This causes the cam 66 to draw the bolt 60 upwardly, locking the nut and cam against plate 42 and bracket 64, respectively. With the base member's position thus held fixed, the leveling feet 17 may be lowered to eliminate sag caused by the weight of the structure. The level of the machine should be rechecked, as well as the Y-axis position, after lowering feet 17 to ensure the previous alignment has not been affected by the feet 17.

FIGS. 6 and 7 illustrate an alternate form of the first support means. The first support means in the embodiment of FIGS. 6 and 7 comprises a transverse beam 26A which extends underneath and is attached to the base. The beam is somewhat longer than the base width so it extends beyond the sides of the base. The protruding portions 26 or the beam 26A mount a pair of leveling feet 28. The feet are threaded into the beam to allow height adjustment. This embodiment has a pivot pin 72 built into the support beam 26A. The pin 72 is engaged with the underside of the base member 12 to provide a pivot axis when the base member's position is adjusted by the lead screw. The base is otherwise free to turn on top of the beam 26A. This arrangement optionally permits deletion of the pivot foot 30 of the other embodiment.

There are other possibilities for the first support means. For example, the beam could be fixed to the base member such that the feet would simply scrub on the floor as pivoting adjustments were made by the lead screw.

It will be realized that alternate mean for actuating the base member could be employed. A motor-driven lead screw is one possibility. Or the lead screw could be replaced by a lever or hydraulic actuating mechanism. Whatever actuating means is used, it must be capable of moving a heavy object a small distance and locking it in place.

Whereas a preferred form of the invention has been shown and described, it will be realized that modifications and alterations may be made thereto without departing from the scope of the following claims.

I claim:

1. A portable coordinate measuring machine, comprising:
   a heavy base member having first and second ends and defining longitudinal and lateral axes;
   first and second support means connected to the base member for supporting it near said first and second ends, respectively, the base member being slidably connected to at least said second support means;
   actuator means connected to the base member and said second support means for effecting fine movements of the base member relative to said second support means; and
   a coordinate measuring device mounted on the base member.

2. The structure of claim 1 further comprising a brake connectable to the base member and said second support means to releasably lock the base member in a fixed position.

3. The structure of claim 1 wherein the base member is pivotally connected to the first support means to define a vertical pivot axis, and the actuator means is arranged to move the base member arcuately about the pivot axis.

4. The structure of claim 3 wherein the first support means comprises a foot located on the longitudinal center line of the base member.

5. The structure of claim 3 wherein the first support means comprises a beam extending under the base member with feet at either end of the beam and a pivot pin mounted in the beam and connected to the base member on its longitudinal center line.

6. The structure of claim of claim 3 wherein the second support means comprises a beam extending under the base member with feet at either end of the beam, the beam having at least one arcuate slot formed therein, and further comprising at least one pin connected to the base member and slidably engaged with the slot.

7. The structure of claim 6 wherein the actuator means comprises a threadedly-engaged lead screw and nut, one of which is connected to the base member and the other to the second support means, and means for turning the lead screw.

8. The structure of claim 7 wherein the nut is pivotally connected to the beam.

9. The structure of claim 1 wherein the actuator means comprises a threadedly-engaged lead screw and nut, one of which is connected to the base member and the other to said second support means, and means for turning the lead screw.

10. The structure of claim 9 wherein the nut is pivotally connected to the second support means.

11. The structure of claim of claim 1 wherein said second support means comprises a beam extending under the base member with feet at either end of the beam, the beam having at least one slot formed therein, and further comprising at least one pin connected to the base member and slidably engaged with the slot.

12. An adjustable base for a portable coordinate measuring machine, comprising:
a heavy base member, far supporting a coordinate measuring machine having first and second ends and defining longitudinal and lateral axes;
first and second support means connected to the base member for supporting it near said first and second ends, respectively, the base member being slidably connected to at least said second support means; and
actuator means connected to the base member and said second support means for effecting fine movements of the base member relative to said second support means.

13. The structure of claim 12 further comprising a brake connectable to the base member and said second support means to releasably lock the base member in a fixed position.

14. The structure of claim 12 wherein the base member is pivotally connected to the first support means to define a vertical pivot axis, and the actuator means is arranged to move the base member arcuately about the pivot axis.

15. The structure of claim 14 wherein the first support means comprises a foot located on the longitudinal center line of the base member.

16. The structure of claim 14 wherein the first support means comprises a beam extending under the base member with feet at either end of the beam and a pivot pin mounted in the beam and connected to the base member on its longitudinal center line.

17. The structure of claim of claim 14 wherein the second support means comprises a beam extending under the base member with feet at either end of the beam, the beam having at least one arcuate slot formed therein, and further comprising at least one pin connected to the base member and slidably engaged with the slot.

18. The structure of claim 17 wherein the actuator means comprises a threadedly-engaged lead screw and nut, one of which is connected to the base member and the other to the second support means, and means for turning the lead screw.

19. The structure of claim 18 wherein the nut is pivotally connected to the beam.

20. The structure of claim 12 wherein the actuator means comprises a threadedly-engaged lead screw and nut, one of which is connected to the base member and the other to said second support means, and means for turning the lead screw.

21. The structure of claim 20 wherein the nut is pivotally connected to the second support means.

22. The structure of claim of claim 12 wherein said second support means comprises a beam extending under the base member with feet at either end of the beam, the beam having at least one slot formed therein, and further comprising at least one pin connected to the base member and slidably engaged with the slot.

* * * * *